US012698220B2

(12) United States Patent
Sauvignet et al.

(10) Patent No.: US 12,698,220 B2
(45) Date of Patent: Aug. 4, 2026

(54) METHOD FOR TREATING WATER BY ADSORPTION ON ACTIVATED CARBON COUPLED WITH AN ADDITION OF OZONE, AND FACILITY FOR IMPLEMENTING SAID METHOD

(71) Applicant: Veolia Water Solutions & Technologies Support, Saint-Maurice (FR)

(72) Inventors: Philippe Sauvignet, Maen Roch (FR); Christophe Sabourdy, Rennes (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 401 days.

(21) Appl. No.: 18/270,084

(22) PCT Filed: Dec. 23, 2021

(86) PCT No.: PCT/EP2021/087514
§ 371 (c)(1),
(2) Date: Jun. 28, 2023

(87) PCT Pub. No.: WO2022/144304
PCT Pub. Date: Jul. 7, 2022

(65) Prior Publication Data
US 2024/0076206 A1      Mar. 7, 2024

(30) Foreign Application Priority Data
Dec. 30, 2020      (FR) ...................................... 2014279

(51) Int. Cl.
*C02F 1/28*          (2023.01)
*C02F 1/20*          (2023.01)
*C02F 1/78*          (2023.01)

(52) U.S. Cl.
CPC ................ *C02F 1/283* (2013.01); *C02F 1/20* (2013.01); *C02F 1/78* (2013.01);
(Continued)

(58) Field of Classification Search
CPC .... C02F 1/283; C02F 1/20; C02F 1/78; C02F 2201/784; C02F 2301/043; C02F 2303/16;
(Continued)

(56) References Cited

U.S. PATENT DOCUMENTS 6,365,048 B1 *    4/2002  Masten .................... C02F 3/085
                                                                    210/617
2011/0233143 A1    9/2011  McGuire et al.
(Continued)

FOREIGN PATENT DOCUMENTS

CN          205061675 U      3/2016
CN          112154123 A      12/2020
(Continued)

OTHER PUBLICATIONS

Summerfelt, S., "Ozonation and UV irradiation—an introduction and examples of current applications", Science Direct, Agricultural Engineering 28 (2003) 21-36, Jul. 24, 2002, pp. 21-36, ElSevier.

*Primary Examiner* — Pranav N Patel
(74) *Attorney, Agent, or Firm* — COATS & BENNETT, PLLC

(57)          ABSTRACT

The invention relates to a water treatment method comprising a step of injecting ozone by a Venturi effect into the water to be treated, immediately followed by a step of ozone saturation of the water to be treated, a step of bringing the ozonated water to be treated into a reactor comprising a fluidised bed of activated carbon particles, a step of placing the ozonated water to be treated in contact with the activated carbon particles according to a flow of water ascending in
(Continued)

the reactor, a step of discharging the water treated in this way. The invention also relates to a facility comprising an activated carbon reactor, means for bringing the water to be treated into the reactor, means for discharging the treated water, a means for injecting ozone into the water by a Venturi effect and a means for saturating the water with ozone mounted directly, or as a bypass, on the means for bringing water into the reactor.

11 Claims, 3 Drawing Sheets

(52) U.S. Cl.
CPC .. *C02F 2201/784* (2013.01); *C02F 2301/043* (2013.01); *C02F 2303/16* (2013.01)

(58) Field of Classification Search
CPC .. C02F 1/28; C02F 1/286; C02F 1/288; C02F 1/72; C02F 1/74; C02F 2201/78; B01D 19/0005
See application file for complete search history.

(56) References Cited

U.S. PATENT DOCUMENTS

| | | |
|---|---|---|
| 2014/0311974 A1 | 10/2014 | Stiles, Jr. et al. |
| 2016/0230193 A1 | 8/2016 | Josse et al. |
| 2019/0194035 A1 | 6/2019 | Mackay Pett |
| 2021/0001256 A1* | 1/2021 | Choi ...................... C01B 32/354 |
| 2021/0002145 A1* | 1/2021 | Chen ....................... C02F 1/001 |
| 2021/0206661 A1* | 7/2021 | Gaid ......................... C02F 1/28 |

FOREIGN PATENT DOCUMENTS

| | | | | |
|---|---|---|---|---|
| FR | 2694209 A1 | 2/1994 | | |
| JP | H04310286 A | 11/1992 | | |
| JP | H0615281 A | 1/1994 | | |
| JP | H07299476 A | 11/1995 | | |
| JP | 2003512736 A | 4/2003 | | |
| JP | 2003126876 A | 5/2003 | | |
| JP | 2016002533 A | 1/2016 | | |
| KR | 20020030463 A | 4/2002 | | |
| WO | 0128950 A1 | 4/2001 | | |
| WO | WO-2019224258 A1 * | 11/2019 | .............. | C02F 1/283 |

* cited by examiner

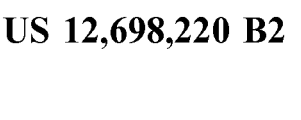
[Fig. 3]

METHOD FOR TREATING WATER BY ADSORPTION ON ACTIVATED CARBON COUPLED WITH AN ADDITION OF OZONE, AND FACILITY FOR IMPLEMENTING SAID METHOD

TECHNICAL FIELD OF THE INVENTION

The invention relates to the technical field of water treatment, and especially relates to methods for obtaining drinking water and methods for purifying sewage. More particularly, the invention relates to methods for treating water to eliminate the organic pollution dissolved by flow ascending on reactor containing activated carbon coupled with the addition of ozone, as well as the facilities making it possible to implement such methods.

PRIOR ART

A plurality of methods exists making it possible to eliminate the organic pollution dissolved within aqueous effluents. The main methods used within drinking water production systems, for treating municipal sewage and for treating residual effluents are the biological methods, the coagulation/flocculation/sedimentation methods, the oxidation methods, and the adsorption methods.

The biological methods and the coagulation/flocculation/sedimentation methods have the drawback of producing sludge, the management of which is increasingly problematic and costly. In addition, the coagulation/flocculation/sedimentation methods have the disadvantage of being based on the supply and the consumption of chemicals (coagulants, flocculation agents) that cannot be extracted from the sludge produced to enable their reuse ahead of this same method. The oxidation methods for their part have the drawback of generating oxidation by-products (partial oxidation of dissolved organic compounds that do not reach up to their complete mineralisation), these by-products may have a toxicity and/or ecotoxicity as high as the initial organic compounds. In addition, some of these oxidation methods are based on mechanisms of homogeneous catalysis (such as for example the Fenton reaction) in addition resulting in a production of sludge.

The adsorption technique, especially on activated carbon, is a technique that is known and commonly used to eliminate dissolved organic pollutants (pesticides, industrial residues, medication residues, etc.) within drinking water production systems and for treating municipal sewage and industrial wastewater. However, this technique has the drawback of producing a significant amount of spent activated carbon that must be extracted from the reactor and replaced with the same amount of fresh activated carbon.

The combined use of an ozonation step and of an adsorption step on activated carbon is also known, especially in potabilization systems. The interest of such a technique is not only related to the coupling of the strong oxidising power of ozone with significant activated carbon adsorption capacities, but also to the acceleration of the decomposition of ozone into hydroxyl radicals by activated carbon. The two steps are carried out consecutively, each in a compartment that is dedicated to it, that is to say that firstly a step of placing the water and the ozone in contact is carried out, and then an adsorption step, that can be performed in a granular activated carbon filter. The injection of ozone is generally performed by porous diffusers installed in the ozonation reactor for a contact time in the reactor of approximately 20 minutes. But as the transfer of ozone into the water is not total, ozone may be present in the gas space in the ozonation reactor. In order to protect the health of operators, it is thus necessary to cover the ozonation reactor and add an ozone destroyer on the vent. In addition, in order to reduce the residual ozone molecules in the water coming out of the ozonation reactor, a reducing agent must be added, such as sodium bisulphite. Another drawback of this technique is that the physical separation of the ozonation and adsorption steps with a long water to be treated/ozone contact time creates favourable conditions for the formation of ozonation by-products, such as bromates that start to form after 2 to 3 minutes of contact, but also of by-products from the organic matter present in water, such as N-nitrosodimethylamine (NDMA). These by-products are not always adsorbable on the activated carbon particles and may accumulate in the water coming out of the adsorption step. Therefore, it is important to prevent their formation.

OBJECTS OF THE INVENTION

One object of the present invention is to propose a technique for treating water that does not result in the formation of by-products, or of solid residues.

Another object of the present invention is to propose a technique for treating water that does not result in the formation of bubbles and/or of a gas cloud above the compartment wherein the adsorption takes place, in order to prevent or at least limit the use of chemicals such as a reducing agent. Such a technique is also involved in the reduction of risks for the health of operators.

Another object of the present invention is to propose a technique for treating water by adsorption on activated carbon that saturates the activated carbon slower, or even that enables its in situ regeneration, in view of reducing the amounts of fresh adsorbent to be introduced as a replacement for the spent adsorbent.

Another object of the present invention is to propose a technique for treating water that consumes less ozone in comparison to existing methods of the advance oxidation type.

Another object of the present invention is to propose a technique that makes it possible to achieve these objects while reducing the contact time between the ozone and the water to be treated.

Another object of the present invention is to propose a technique for treating water that makes it possible to eliminate bacteria and viruses present in the water to be treated, without needing steps particularly implemented for this purpose.

SUMMARY OF THE INVENTION

These objects, as well as others that will become apparent in the following, are achieved thanks to the invention.

A first object according to the invention relates to a water treatment method. In particular, the method according to the invention comprises:
- a step of injecting ozone into the water to be treated,
- a step of bringing the ozonated water to be treated into a reactor comprising a fluidised bed of activated carbon particles,
- a step of placing the ozonated water to be treated in contact with the activated carbon particles according to a flow of water ascending in the reactor,
- a step of discharging the water treated in this way,
wherein the step of injecting ozone into the water to be treated is carried out by a Venturi effect, and wherein the injection step is immediately followed by a step of ozone saturation of the water to be treated.

This method makes it possible to incorporate ozone into the water then to dissolve it for the purposes of eliminating the bubbles while regenerating the activated carbon particles present in the reactor. Thanks to this method, and as will be demonstrated in the examples, it is possible to reduce the amount of ozone to be used as well as the amount of fresh activated carbon to be introduced as a replacement for the spent activated carbon, in comparison with the existing methods, while maintaining good water treatment performances.

Alternatively, the amounts of ozone and of activated carbon may be equivalent to those used in the existing methods, and then the water treatment performances are improved in relation to those obtained by these existing methods.

According to a preferred embodiment, the step of saturating the water with ozone is performed with the aid of a saturation cone or of a degassing column.

The use of a saturation cone is advantageous because it is a device that is simple, effective and quick to install, and the footprint of which may be chosen depending on the configuration of the facility and on the desired performances. Thus, the saturation cones may be easily integrated into existing facilities comprising a fluidised bed reactor of activated carbon particles, in view of improving its performance or of reducing the consumption of supplementary fresh activated carbon. The saturation may also be performed in a degassing column.

According to a preferred embodiment, the step of injecting and the step of saturating the water with ozone have an overall duration less than 1 minute, preferably between 10 and 30 seconds.

Indeed, the method according to the invention makes it possible to improve the performances of the water treatment or to reduce the consumption of ozone and of fresh activated carbon without slowing down the water treatment process. The injection of ozone and the dissolution thereof in the water only takes a few seconds, which is particularly interesting in the context of modifying an existing facility.

According to a particular embodiment, the steps of injecting ozone and of saturating the water with ozone are implemented in means for bringing the water to be treated into said reactor. Alternatively, these steps may be implemented in a pipe mounted as a bypass on means for bringing the water to be treated into said reactor.

This choice of configurations makes it possible to cleverly adapt as best as possible the method to existing facilities, depending especially on the available floor space.

According to one embodiment, the activated carbon particles used according to the method are agglomerates having a particle size between 300 µm and 1500 µm, preferably between 400 µm and 800 µm, and a true density greater than 0.45.

Activated carbon agglomerates with these features are particularly advantageous, because they make it possible to obtain an optimum expansion of the fluidised bed of activated carbon particles, which improves the capacity of adsorption of pollutants thereon.

According to one embodiment, the fluidised bed reactor according to the method is equipped with at least one means for deflecting the water disposed in the upper portion. Such a deflection means is intended to reduce the speed of the ascending flow of water to arrange a tranquil area above the bed of activated carbon particles. Such a tranquil area is an area of low hydrodynamic turbulences that makes it possible to prevent activated carbon particles, and especially the finest particles, from being carried away by the ascending flow of water and from escaping from the reactor, which would increase the consumption of supplementary fresh activated carbon. This is particularly advantageous in the case where the coalescence of ozone at the surface of the activated carbon particles would cause the emission of bubbles and losses of carbon.

According to one variant, the at least one deflection means consists of a set of blades inclined in relation to the vertical and mutually parallel, inclined in relation to the vertical by an angle θ between 500 and 60°, preferably by an angle θ close to 60°.

According to one embodiment, when at least one deflection means is present in the reactor, the reactor further comprises means for recovering the water disposed downstream of the tranquil area, such recovery means preferably consisting of a prism-shaped chute with side faces forming an angle α of 45° to 70° in relation to the horizontal and that are each equipped with a first fluid spout and with a deflector acting as a baffle as a deflection means.

According to one embodiment, the speed of the flow of water ascending in the fluidised bed reactor is between 8 m/h and 50 m/h, preferably between 20 m/h and 40 m/h.

As gas bubbles are not compatible with the operation of a fluidised bed reactor because they cause hydraulic disturbances, it is imperative that there are no gas bubbles (in this case ozone) in the ozonated water. This is achieved thanks to the dissolution of ozone in the water in the saturation cone, prior to its entry into the activated carbon reactor. The absence of ozone bubbles in the water reduces the turbulence of the bed of activated carbon particles. This has the effect of further reducing the amount of activated carbon inclined to escape from the reactor.

Another object according to the invention relates to a facility for treating water according to the method of the invention.

In particular, the facility according to the invention comprises:

an activated carbon reactor comprising a fluidised bed of activated carbon particles, means for bringing the water to be treated into the reactor, means for discharging the treated water, and further comprises a means for injecting ozone into the water by a Venturi effect and a means for saturating the water with ozone mounted directly on the means for bringing the water into the reactor, or on a pipe mounted as a bypass on the means for bringing the water to be treated into the reactor.

Such a facility has the advantage of not significantly increasing the footprint of existing structures, which may easily be modified to integrate the supplementary technical features according to the invention.

According to a preferred embodiment, the activated carbon particles in the facility are agglomerates having a particle size between 300 µm and 1500 µm, preferably between 400 µm and 800 µm, and a true density greater than 0.45.

Such activated carbon agglomerates are particularly adapted to the facility according to the invention. Their particular properties make it possible to obtain an optimum expansion of the bed of activated carbon, even when high speeds are applied to the ascending water flow.

According to a particular embodiment, the reactor of the facility is equipped with at least one deflection means disposed in the upper portion of said reactor.

Such means cleverly make it possible to generate a tranquil area in the upper portion of the reactor, which makes it possible to prevent the escape of activated carbon particles, especially the finest ones.

According to one variant, said at least one deflection means consists of a set of blades inclined in relation to the vertical and mutually parallel, inclined in relation to the vertical by an angle θ between 50° and 60°, preferably by an angle θ close to 60°.

According to one embodiment, and when the reactor comprises deflection means, the reactor further comprises means for recovering the water disposed downstream of the tranquil area, the recovery means preferably consisting of a prism-shaped chute with side faces forming an angle α of 45° to 70° in relation to the horizontal and that are each equipped with a first fluid spout and with a deflector acting as a baffle as a deflection means.

BRIEF DESCRIPTION OF THE FIGURES

FIG. 1 presents a schematic view of the facility wherein the Venturi system and the means for saturating the water with ozone are mounted on the pipe bringing the water to the reactor.

FIG. 2 presents a schematic view of a facility according to the invention wherein the Venturi system and the means for saturating the water with ozone are installed on a pipe mounted as a bypass of a pipe bringing the water to be treated to the reactor.

FIG. 3 is a diagram showing the percentage of elimination of various micropollutant compounds in a bed reactor of activated carbon particles (10 g/m$^3$ of activated carbon particles) in the presence or absence of ozone. In white: absence of ozone; in black: ozone at 2 g/m$^3$. The list of compounds is given in Table 2.

DETAILED DESCRIPTION OF THE INVENTION

The invention aims to improve the existing water treatment methods and facilities. In particular, the invention aims to improve the techniques for treating sewage and/or drinking water. Indeed, this water is particularly appropriate for treatments by ozonation and adsorption on activated carbon. Thus, the techniques according to the invention are particularly effective for the treatment of such water.

The methods and facilities according to the invention imply in an original manner the association of a means for injecting ozone by a Venturi effect with a means for saturating the water with ozone, just upstream of a reactor dedicated to the adsorption of polluting substances through a fluidised bed of activated carbon particles.

Within the meaning of the invention, "polluting substances" means organic and chemical matter that adversely affects the quality of water, including that present in very low concentrations (micropollutants).

In a first step of the method according to the invention, ozone is injected into the water to be treated. The ozonated water is subsequently led towards a reactor comprising a fluidised bed of activated carbon particles. During its evolution according to a flow ascending through the bed of activated carbon particles, the polluting substances of the water are adsorbed on the activated carbon particles, then the treated water is discharged from the reactor.

The injection of ozone is performed by the suction generated by a Venturi effect, which has the advantage of preventing any ozone from escaping into the atmosphere and makes it possible to mix it with the water. The Venturi effect is a suction effect generated by a fluid in motion that is subjected to a negative pressure. Thus, through the Venturi effect, the water to be treated is subjected to a negative pressure that will make it possible to suck up the ozone in the water. Thanks to this technique, all of the ozone injected is incorporated and mixed into the water to be treated. It is therefore possible to use reduced amounts of ozone in relation to the techniques known from the prior art. Preferably, the amount of ozone to be injected into the water is between 0.5 and 3.0 mg per litre of water to be treated. The generation of a Venturi effect is performed by any means known in the art. In particular, it is performed thanks to a Venturi system.

The water to be treated mixed with ozone is then immediately subjected to an ozone saturation step. The ozone molecules are then dissolved in the water, significantly preventing the formation of ozone bubbles in the water. Indeed, such bubbles favour the turbulences in the bed of activated carbon particles and consequently their removal from the reactor. In addition, ozone in the form of bubbles is not captured so well on the surface of activated carbon particles. Yet, the activated carbon is capable of reducing the ozone molecules. Reducing the capacity to capture ozone by the activated carbon particles would therefore have the consequence of favouring the formation of a harmful gas space above the reactor. Finally, the very short time of a few seconds for injecting ozone and saturating the water to be treated with ozone also has the advantage of preventing the formation of by-products by reaction of ozone with the species contained in the water to be treated. The saturation of water with ozone is performed by any known means. In particular, it is performed with the aid of a saturation cone, which makes it possible to obtain a transfer efficiency in the order of 95 to 99%. Alternatively, it is possible to perform the step of saturating the water with ozone thanks to a degassing column. Such a column has the advantage of being simple to construct, but it has a significant height that may hinder its implementation in an existing operation.

Without wanting to be linked to any theory, it can be considered that the improvements obtained thanks to the method according to the invention are partly based on the capacity of dissolved ozone molecules to react at the surface of activated carbon particles to create new surface functional groups. Indeed, the activated carbon captures the polluting molecules thanks to the presence of adsorption sites but also thanks to the presence of functional groups capable of binding to polluting substances, especially organic. Ozone, due to its strong oxidising power, makes it possible to create new functional groups at the surface of activated carbon particles. The adsorption capacity of activated carbon particles is therefore significantly improved, in particular in relation to organic polluting substances such as pesticides, medication residues and natural organic substances. Thus, for the same amount of activated carbon used, the water treatment performances are significantly improved. Thus, a reduction of the renewal of carbon up to 10 g/m$^3$ of water to be treated was observed, associated with an increase of 25% of the adsorption performances of polluting substances. Alternatively, the method according to the invention makes it possible to maintain identical performances while significantly reducing the amount of activated carbon needed to treat the water. In addition, the reaction of ozone at the surface of the activated carbon advantageously makes it possible to reduce the ozone, and thus prevent ozone from being found in the treated water and/or in a gas space above the reactor.

As demonstrated in the experimental part, the method according to the invention makes it possible to not form by-products such as bromates, and this even in the presence of high concentrations of bromides in the water to be treated. In addition, the method according to the invention makes it possible to reduce the vast majority of micropollutants at rates greater than 90%. Finally, the invention makes it possible to clean water better, especially by reducing bacteria and viruses in the water thanks to the action of ozone.

Another advantage of the method according to the invention is that the total duration of the steps of injecting ozone and of ozone saturation of the water to be treated is very short.

According to a particular embodiment, the step of injecting ozone and the step of saturating the water with ozone have a total duration less than 60 seconds, preferably less than 30 seconds, more preferably between 10 and 20 seconds. It then only takes a few seconds for the water to be treated to be saturated with ozone, and thus the water treatment performances to be significantly improved, or, for equal performance, the amounts of activated carbon particles to be renewed to be significantly reduced. Reducing the contact time advantageously makes it possible to avoid, or at least reduce, the formation of by-products.

According to one embodiment, the steps of injecting ozone and of saturating the water with ozone are implemented in the means for bringing the water to be treated to the reactor, such as for example a pipe. Indeed, the method according to the invention gives better results when these two steps are carried out close to the reactor containing the fluidised bed of activated carbon particles. An increase in the time for bringing the water saturated with ozone favours the appearance of by-products such as bromates.

However, the method according to the invention also makes it possible to perform these injection and saturation steps at another level, which makes it possible to adapt its implementation to various configurations of water treatment facilities.

Thus, according to another embodiment, these steps are performed at a pipe mounted as a bypass of the means for bringing the water to be treated to the reactor. It is thus possible to add a preliminary step of bringing the water to be treated to a pipe mounted as a bypass of the main pipe, where the steps of injecting ozone and of saturating water with ozone will be carried out. An additional step of bringing the water thus saturated with ozone to the main pipe can then be provided.

Once the water to be treated is saturated with ozone, it is brought into a reactor comprising a fluidised bed of activated carbon particles. This step is performed by the means for bringing the water to be treated into the reactor, such as for example a main pipe, possibly preceded by a step of bringing the water saturated with ozone from the pipe mounted as a bypass to the means for bringing the water to be treated into the reactor.

In the reactor, the water saturated with ozone evolves according to a flow ascending through the fluidised bed of activated carbon particles. As indicated previously, the ozone contained in the water will make it possible to create new functional groups at the surface of the activated carbon particles. The polluting substances contained in the water to be treated will thus be adsorbed by both the adsorption sites of the activated carbon particles, and by the functional groups created at the surface of the activated carbon particles. At the same time, the reaction of the ozone at the surface of the activated carbon particles will lead to its reduction, so that there will no longer be any or very little ozone in the interstitial water.

In a preferred embodiment, the step of placing the water to be treated saturated with ozone in contact is performed on activated carbon particles in the form of agglomerates. The agglomerates of activated carbon particles differ especially from powdered activated carbon by their particle size, their specific surface and their density.

Preferably, the agglomerates of activated carbon particles are in the form of micrograins. The micrograins of activated carbon implemented in the method according to the invention have an average particle size between 300 μm and 1500 μm, preferably between 400 μm and 800 μm, a proportion of which strictly less than 5% of particles of size smaller than 400 μm. It will be noted that the particle size of powdered activated carbon is significantly lower, generally between 5 μm and 50 μm, in particular between 10 μm and 25 μm.

According to one embodiment, the density of the micrograins of activated carbon is greater than 0.45, preferably greater than 0.5 (dry product).

According to one embodiment, the concentration of activated carbon particles in the reactor is between 100 g/L and 400 g/L, preferably between 150 g/L and 300 g/L.

The speed of the ascending flow of water applied in the reactor is adjusted depending on the particle size of the activated carbon particles in the bed of particles. In fact, it should not cause an expansion of the bed of particles that is too small or too large. When the expansion of the bed is too small, the carbon particles are not completely separated from one another, which reduces the adsorption performances of the bed of particles. Conversely, when the expansion is too great, the activated carbon particles further risk being carried away by the ascending flow of water and leaving the reactor, increasing the amount of fresh activated carbon to be added to compensate these losses. In practice, the speed of the ascending flow may thus preferably be chosen to form an area of expansion of the bed of activated carbon particles and a transition area above it, the concentration of particles being less dense in the transition area than in the expansion area.

According to one embodiment, the speed of the flow of water ascending in the reactor is between 8 m/h and 50 m/h, preferably between 20 m/h and 40 m/h.

This embodiment in particular is suitable when the activated carbon particles forming the bed of the reactor are micrograins such as described previously.

According to a particular embodiment, means for deflecting the water are positioned in the upper portion of the reactor. Such deflection means are for example described in the international patent application published under the number WO2019224258A1. They contribute to the formation of a tranquil area in the upper portion of the reactor.

This makes it possible to use high speeds of ascending flows of water to be treated while preventing any escape of activated carbon particles. This makes it further possible to dispense with the use of ballasting polymers even at relatively high speeds of ascending flows of water to be treated.

Preferably, the deflection means consist of a set of blades inclined in relation to the vertical and mutually parallel. Preferably, these blades are inclined in relation to the vertical by an angle θ between 50° and 60°. Advantageously, the blades may especially be inclined in relation to the vertical by an angle θ close to 60°.

The blades may be spaced apart from one another by a distance between 25 mm and 100 mm. The blades may especially be spaced apart from one another by a distance between 36 mm and 42 mm. This spacing is particularly appropriate for adsorbent media particles, in particular grains or micrograins of activated carbon, of particle size between 300 μm and 1500 μm. The speed of the water reduces within the blades during its passage into the deflection means, which makes it possible to create the tranquil area, area where the particles can settle.

According to a particular embodiment, when the deflection means are present, the reactor of the facility further comprises means for recovering the water disposed downstream of the tranquil area. Such means may for example consist of a prism-shaped chute with side faces forming an angle α of 45° to 70° in relation to the horizontal and that are each equipped with a first fluid spout and with a deflector acting as a baffle as a deflection means. The angle α may especially have a value close to 60°. Such a chute has already been described in the patent application published under the number FR2694209A1.

Figure 1:
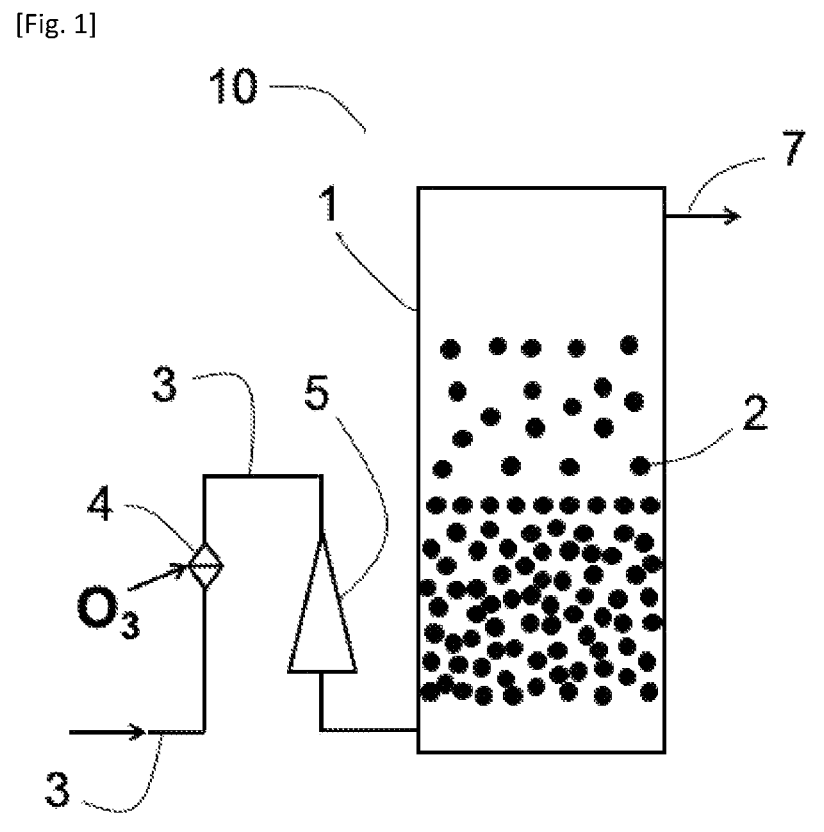
Figure 2:
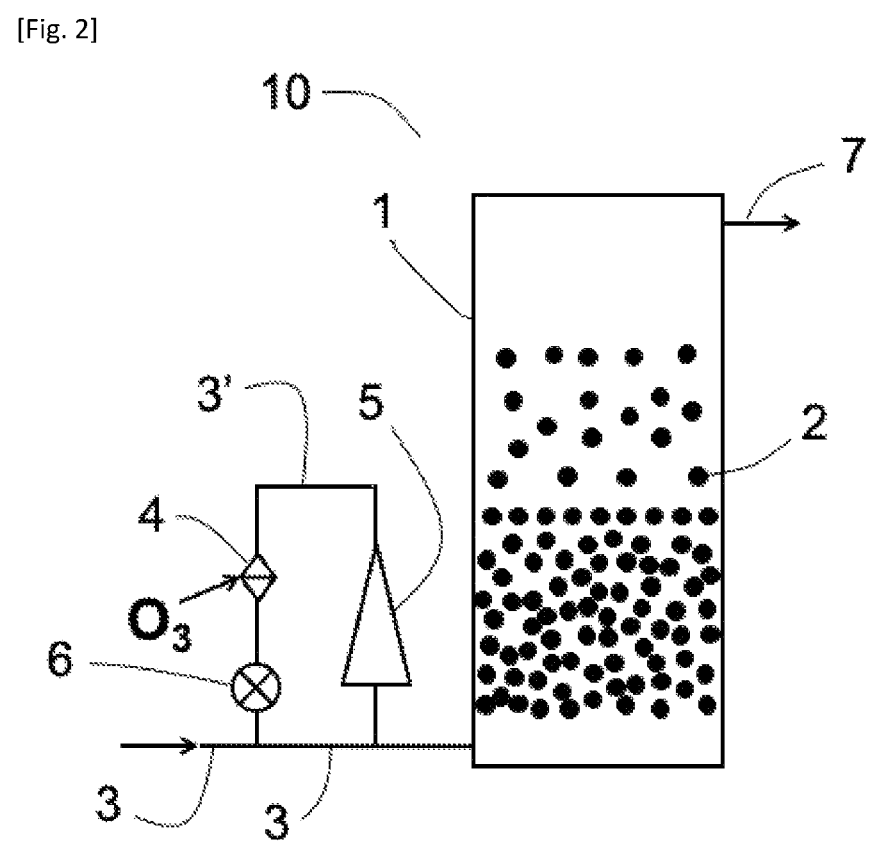

The invention also relates to a facility for treating water, in particular sewage or drinking water, adapted to implement the method according to the invention described previously. This facility is now described with reference to FIGS. 1 and 2, which are used only for illustration purposes and do not constitute a limitation of the detailed description given hereinafter.

The facility 10 according to the invention comprises:
an activated carbon reactor 1 comprising a fluidised bed of activated carbon particles 2,
means 3 for bringing the water to be treated into the reactor 1,
means for discharging the treated water 7,
as well as a means for injecting ozone into the water to be treated by a Venturi effect, here a Venturi system 4, and a means for saturating the water with ozone, here a saturation cone 5, located either directly on the means 3, or on a means 3' mounted as a bypass of the means 3.

The reactor 1 suitable for the method according to the invention further comprises a fluidised bed of activated carbon particles 2. The reactor may be of cylindrical or square shape. Preferably, the reactor has a height between 3 m and 10 m. It is equipped with a means for injecting and distributing the water to be treated in the lower portion of the reactor, in order to form an ascending flow of water within the reactor.

The activated carbon particles constituting the bed 2 of the reactor 1 are such as described above. The bed of activated carbon particles in the reactor preferably has a height between 1.5 m and 3 m at rest, and a height during expansion between 2 m and 5 m.

The water supply means 3 and the optional bypass means 3' of the water supply means 3 may be pipes. When bypass means 3' are implemented, the means 3 and 3' are connected to one another by known means, such as tee fittings. In one variant of this particular embodiment, means 6 for bringing the water to be treated may then be provided in order to lead a portion of the water to be treated from the means 3 to the means 3'. This may especially concern a pump, preferably a jet pump.

A Venturi system 4 suitable within the meaning of the invention may be any known Venturi system. The Venturi injectors marketed by Stübbe or equivalent can especially be cited.

A saturation cone within the meaning of the invention may be chosen from known cones suitable for saturating the water with ozone. It may further be chosen depending on the various criteria, in particular on the space occupied and on the flow rate of the water to be treated. For example, saturation cones marketed by Pentair or Linde-Gas or equivalent are known. Of course, other means for saturating the water with ozone may be implemented, such as for example a degassing column.

According to a particular embodiment, the reactor of the facility according to the invention is equipped with deflection means (not shown). The deflection means suitable for the facility according to the invention are those described above. Their implementation in the facility advantageously makes it possible to not have to increase the height of the reactor in order to avoid the losses of activated carbon particles, which makes it possible to obtain a more compact facility. Advantageously, the deflection means are completed with water recovery means as described previously.

Advantageously, the facility comprises means 7 for discharging the treated water, for example a pipe, in order to lead the treated water towards a collection tank or towards a supplementary treatment reactor.

EXAMPLES

Other features and advantages of the invention will become more apparent from the following examples, given for illustrative and non-limiting purposes.

Example 1: formation of functional groups on the activated carbon particles Laboratory tests were carried out in order to validate the effects of ozonation of the activation of functional groups at the surface of powdered and micro-granular activated carbon. It is known that the surface of activated carbon is negatively charged when the pH is higher than the "Point of Zero Charge" pH, $pH_{PZC}$, and that it is positively charged when the pH is less than the $pH_{PZC}$. In the last case, the activated carbon will have a strong affinity for anionic compounds.

In these tests, the pH of the water containing the activated carbon tested was located between 7.4 and 7.9. The activated carbon was therefore adapted to the negatively charged organic substances. The amount of ozone injected was 2 $g/m^3$ of water to be treated, or zero. The activated carbon particles were present at a concentration of 1.2 g/L. The tests were carried out for 10 minutes.

The identification of surface functions was performed according to the Boehm method. The value of the iodine number was obtained according to the method ASTM D4607-94 (2006). The $pH_{PZC}$(Point of Zero Charge) was obtained according to the Noh and Schwarz method (1989).

Table 1 presents the results obtained.

TABLE 1

| Ozone dosage $g/m^3$ | Group I meq/g | Group II meq/g | Group III meq/g | Group IV meq/g | Group total meq/g | Iodine number mg/g | $pH_{PZC}$ |
|---|---|---|---|---|---|---|---|
| 0 | 2.58 | 0.66 | 2.36 | 3.24 | 8.84 | 910 | 8.05 |
| 2.0 | 4.30 | 0 | 0 | 9.28 | 13.58 | 930 | 8.28 |

The pH$_{PZC}$ of the water containing the activated carbon was 8.05 without ozone and 8.28 after ten minutes of ozonation (degassing of $CO_2$ present in the sample). The in situ ozonation of activated carbon particles acted directly on the surface of the material by creating or by increasing the surface functional groups. Thus, an increase of the surface groups was observed.

The surface acid-base properties of activated carbon are very high and seem to prevail over the features of its porosity in the case of the adsorption of organic compounds in aqueous phase. The surface chemistry of carbon results from the existence of heteroatoms such as oxygen, nitrogen, hydrogen, chlorine, sulphur and phosphorus. These heteroatoms form organic functional groups (pendant functions), such as ketones (Group I), ethers (Group II), amines (Group III) and phosphates (Group IV) located on the peripheries of carbon crystallites. Their content depends on the origin of the carbon and of its activation method, and determines the acidity or the basicity of the material. Their presence has an insignificant effect on the adsorption of polar molecules.

The results presented above show that Group I passes from 2.58 meq/g to 4.30 meq/g, signifying a significant increase of strong carboxyl functions, Group III drops from 2.36 meq/g to 0 meq/g, which is explained by an oxidation of the hydroxyl and phenol groups into carbonyl and car-boxyl groups, and Group IV passes from 3.24 meq/g to 9.28 meq/g. This is particularly interesting because groups I and IV are those involved in the adsorption of organic substances, especially by CO and OH interactions (organic substance—surface functions).

The iodine number increases and passes from 910 to 930 mg/g. This increase of the iodine number and the overall increase of the surface functions show the optimisation of adsorption performances of the activated carbon having received ozone.

Example 2: Elimination of In Situ Polluting Substances

Existing fluidised bed reactors of activated carbon micro-grains having a concentration of 100 to 300 g/L of activated carbon were modified in such a way as to make it possible to inject ozone and saturate the water with ozone prior to its entry into the reactor. The water used came from two factories one producing drinking water, the other sewage during tertiary treatment.

For each of these factories, the amount of ozone injected was between 1 g/m$^3$ and 2.5 g/m$^3$. The rate of renewal in activated carbon micrograins was between 10 mg/L and 20 mg/L. The speed of the flow of water ascending in the reactor was between 20 m/h and 40 m/h. The contact time of the water to be treated saturated with ozone in the fluidisa-tion reactor was approximately 10 minutes.

The content in various compounds listed in Table 2 below was measured in order to evaluate the percentage of their elimination depending on the treatment.

TABLE 2

| Compound No. | Name | CAS No. |
| --- | --- | --- |
| 1 | Carbamazepine | 298-46-4 |
| 2 | Gabapentin | 60142-96-3 |
| 3 | Primidone | 125-33-7 |
| 4 | Clarithromycin | 81103-11-9 |
| 5 | Sulfamethoxazole | 723-46-6 |
| 6 | Trimethoprim | 738-70-5 |
| 7 | Diclofenac | 15307-86-5 |

TABLE 2-continued

| Compound No. | Name | CAS No. |
| --- | --- | --- |
| 8 | Mefenamic acid | 61-68-7 |
| 9 | Venlafaxine | 93413-69-5 |
| 10 | Atenolol | 29122-68-7 |
| 11 | Atenolol acid | 56392-14-4 |
| 12 | Metoprolol | 51384-51-1 |
| 13 | Hydrochlorothiazide | 51384-51-1 |
| 14 | Valsartan | 137862-53-4 |
| 15 | Bezafibrate | 41859-67-0 |
| 16 | Benzotriazole | 95-14-7 |
| 17 | Methylchloroisothiazolone | 26172-55-4 |

The results obtained are presented in FIG. 3.

They confirm that the method according to the invention results in a significant improvement in the water treatment quality. A gain in the order of 20% to 25% of the average performance for eliminating various micropollutants is recorded on one of the sites, bringing the elimination effi-ciency between 85% and 92%. On the other site, where apart from benzotriazole (77.6%), all the other molecules are eliminated at over 80%, with efficiencies reaching 99% for carbamazepine (compound no. 1), diclofenac (compound no. 7), hydrochlorothiazide (compound no. 13) and sulfame-thoxazole (compound no. 5, elimination at 98%).

Example 3: Formation of by-Products

In the techniques of the prior art, the ozone concentrations used are between 8 and 10 g/m$^3$. It is known that such concentrations and long water/ozone contact times favour the appearance of by-products by oxidation of the polluting substances by ozone. In particular, it is well known that the ozonation of water containing bromides leads to the forma-tion of bromates.

Tests were carried out to check if the low doses of ozone implemented thanks to the invention also resulted in a harmful formation of by-products. Tertiary sewage contain-ing between approximately 6.5 and 7 mg/L of bromides was used for these tests. The concentration of ozone injected was approximately 2 g/m$^3$, and the concentration in activated carbon particles in the fluidised bed reactor was from 100 to 300 g/L. The contact time in the fluidised bed was longer than 8 minutes. The results were compared to those obtained by performing ozonation in a distinct compartment, such as what is known from the prior art, with a contact time of 3 minutes, and an injection of ozone of 3 g/m$^3$. They were also compared with those obtained in the fluidised bed reactor without ozone injection.

Table 3 presents the results of the bromate concentrations in the water.

TABLE 3

| | Ozonated tertiary water | Non-ozonated tertiary water treated on fluidised bed of activated carbon micrograins | Water saturated with ozone then treated on fluidised bed of activated carbon particles according to the invention |
| --- | --- | --- | --- |
| Bromates (µg/L) | 137 | <10 | <10 |

The ozone concentrations injected less than 3 g/m$^3$ were too low to oxidise the polluting substances, in particular the micropollutants. This made it possible to not produce by-products in the water.

In addition, thanks to the method of the invention, the ozone was injected almost directly into the reactor containing the activated carbon. This resulted in a direct reaction between the oxidant (ozone) and the reducing agent (activated carbon), which is much faster than the reaction between the ozone and the polluting substances such as organic matter and micropollutants. This is the reason why the ozonation reaction did not modify the micropollutants. In addition, the interstitial water was free of residual ozone.

Example 4: Bactericidal Action

The coliform bacteria were numbered in the raw water to be treated, then in the water coming out of the reactor containing the activated carbon. A reduction of the number of total coliforms of approximately one to two log was observed. These results confirm the bactericidal action of ozone.

As ozone is also known for its virucidal action, comparable results were expected concerning the viruses present in the water to be treated.

REFERENCES

Joong S Noh, James A Schwarz, 1989. Estimation of the point of zero charge of simple oxides by mass titration. Journal of Colloid and Interface Science 130(1): 157-164. ISSN 0021-9797, https://doi.org/10.1016/0021-9797(89) 90086-6.

The invention claimed is:

1. A method of treating water containing polluting substances, comprising:

directing the water containing the polluting substances through a Venturi;

injecting ozone into the water via the Venturi;

immediately after injecting ozone into the water, directing the water through an ozone saturator and saturating the water with ozone to form saturated ozonated water;

directing the saturated ozonated water into a bottom portion of a reactor containing activated carbon;

directing the saturated ozonated water upwardly through the reactor and fluidizing the activated carbon in the reactor;

contacting the fluidized activated carbon with the saturated ozonated water, causing at least some of the polluting substances to be adsorbed onto adsorption sites on the activated carbon which results in treated water; and directing the treated water depleted in polluting substances from an upper portion of the reactor.

2. The method of claim 1 wherein the saturated ozonated water includes dissolved ozone molecules and wherein the method includes reacting the dissolved ozone molecules at the surfaces of the activated carbon to form new surface functional groups and binding at least some of the polluting substances with the new surface functional groups.

3. The method of claim 1 wherein the time between injecting the ozone into the water and saturating the water with ozone is less than 60 seconds.

4. The method of claim 2 including maintaining the treated water substantially free of ozone by reacting the ozone molecules with the activated carbon at the surfaces of the activated carbon.

5. The method of claim 1 including contacting the upward flowing treated water in an upper portion of the reactor with a deflector so as to form a tranquil area in the upper portion of the reactor and to generally reduce the speed of the saturated ozonated water moving upwardly through the reactor.

6. The method of claim 1 including dissolving the ozone molecules in the water so as to prevent the formation of ozone bubbles in the water.

7. The method of claim 1 including forming functional groups on the surfaces of the activated carbon and adsorbing the polluting substances by the functional groups on the surfaces of the activated carbon.

8. The method of claim 1 wherein said activated carbon is in the form of agglomerates having a particle size between 300 μm and 1500 μm.

9. The method of claim 1 wherein the concentration of the activated carbon in the reactor is between 100 g/L and 400 g/L.

10. The method of claim 1 wherein the steps of ejecting ozone into the water via the Venturi and directing the water through an ozone saturator and saturating the water with ozone to form the saturated ozonated water has an overall duration less than 1 minute.

11. The method of claim 1 including reducing the turbulence in the water in the reactor while the activated carbon is fluidized therein and avoiding the formation of a gas in the reactor by dissolving ozone molecules in the water prior to the water entering the reactor.

\* \* \* \* \*